US011416436B2

(12) United States Patent
Huehn

(10) Patent No.: US 11,416,436 B2
(45) Date of Patent: Aug. 16, 2022

(54) DEVICE WITH A FOUNTAIN CODE DECODING UNIT FOR RECONSTRUCTING A CONFIGURATION DATA RECORD

(71) Applicant: WAGO Verwaltungsgesellschaft mbH, Minden (DE)

(72) Inventor: Thomas Huehn, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 17/013,427

(22) Filed: Sep. 4, 2020

(65) Prior Publication Data

US 2021/0064562 A1  Mar. 4, 2021

(30) Foreign Application Priority Data

Sep. 4, 2019  (DE) .................. 10 2019 123 712.2

(51) Int. Cl.
| | | |
|---|---|---|
| G06F 13/42 | (2006.01) | |
| G06F 13/40 | (2006.01) | |
| G06F 9/30 | (2018.01) | |
| G06F 9/54 | (2006.01) | |

(52) U.S. Cl.
CPC ...... *G06F 13/4221* (2013.01); *G06F 9/30145* (2013.01); *G06F 9/546* (2013.01); *G06F 13/4004* (2013.01)

(58) Field of Classification Search
None
See application file for complete search history.

(56) References Cited

U.S. PATENT DOCUMENTS

| | | | | |
|---|---|---|---|---|
| 8,072,098 | B2* | 12/2011 | Elias | G05B 19/054 |
| | | | | 307/140 |
| 8,107,439 | B2* | 1/2012 | Yan | H04W 72/085 |
| | | | | 370/332 |
| 8,392,626 | B2* | 3/2013 | Wormmeester | G06F 13/4072 |
| | | | | 710/11 |
| 8,656,065 | B1* | 2/2014 | Gerhart | G06F 13/385 |
| | | | | 710/14 |
| 8,839,310 | B2* | 9/2014 | Ramaswamy | H04L 1/0041 |
| | | | | 725/62 |
| 9,215,457 | B2* | 12/2015 | Koike-Akino | H04N 19/164 |
| 9,626,196 | B2* | 4/2017 | Zimmer | H04L 9/3268 |
| 9,729,274 | B2* | 8/2017 | Koslov | H04L 1/0065 |

(Continued)

FOREIGN PATENT DOCUMENTS

| | | | | |
|---|---|---|---|---|
| EP | | 2924520 A1 | 9/2015 | |
| WO | WO-2018026505 A1 * | | 2/2018 | ........... G06F 3/0484 |

OTHER PUBLICATIONS

"An Architectural Approach for Reconfigurable Industrial I/O Devices" by Kirschberger et al, copyright 2014, IEEE. (Year: 2014).*

(Continued)

*Primary Examiner* — Steven G Snyder
(74) *Attorney, Agent, or Firm* — Muncy, Geissler, Olds & Lowe, P.C.

(57) ABSTRACT

A device is provided having a communication interface and a Fountain code decoding unit, set up to reconstruct a configuration data record from a plurality of data packets received via the communication interface, wherein the device is set up to configure or to reconfigure itself using the reconstructed configuration data record.

20 Claims, 4 Drawing Sheets

(56) References Cited

U.S. PATENT DOCUMENTS

| | | | |
|---|---|---|---|
| 10,248,601 B2* | 4/2019 | McLaughlin | G06F 13/4027 |
| 2003/0060908 A1* | 3/2003 | Moehler | G05B 19/0423 |
| | | | 700/86 |
| 2009/0300598 A1* | 12/2009 | Choi | G06F 8/61 |
| | | | 717/173 |
| 2009/0304117 A1* | 12/2009 | Koslov | H04L 1/0065 |
| | | | 375/340 |
| 2013/0308700 A1* | 11/2013 | Koike-Akino | H03M 13/373 |
| | | | 375/240.07 |
| 2015/0271297 A1* | 9/2015 | Zimmer | H04L 67/34 |
| | | | 709/203 |
| 2015/0278144 A1* | 10/2015 | McLaughlin | G06F 13/4027 |
| | | | 710/104 |
| 2016/0306623 A1* | 10/2016 | Su | G06F 13/4022 |
| 2018/0032468 A1* | 2/2018 | Dutta | G06F 3/0484 |
| 2019/0103881 A1 | 4/2019 | Connor et al. | |
| 2021/0103546 A1* | 4/2021 | Wessling | G06F 13/387 |

OTHER PUBLICATIONS

"AD74413R—Quad-Channel, Software Configurable Input and Output" Data Sheet by Analog Devices, copyright 2019. (Year: 2019).*
"FCE (PMD) Controller—Product Information Note" by Honeywell, Apr. 2011. (Year: 2011).*
"Application Note 7133—Configurable Input/Output Modes for PLC Systems Using the MAX22000 and MAX14914A" by Maxim/Analog, Oct. 19, 2020. (Year: 2020).*
"Modular I/O-System Fieldbus Coupler PROFINET IO 750-370—Manual" copyright 2011 by Wago. (Year: 2011).*

* cited by examiner

DEVICE WITH A FOUNTAIN CODE DECODING UNIT FOR RECONSTRUCTING A CONFIGURATION DATA RECORD

This nonprovisional application claims priority under 35 U.S.C. § 119(a) to German Patent Application No. 10 2019 123 712.2, which was filed in Germany on Apr. 9, 2019, and which is herein incorporated by reference.

BACKGROUND OF THE INVENTION

Field of the Invention

The present invention relates to a device with a Fountain code decoding unit. In particular, the present invention relates to an input/output module, I/O module, having a Fountain code decoding unit.

Description of the Background Art

If a field device is connected to an I/O module, it may be necessary to configure the I/O module to operate the field device. A configuration can be used, for example, to specify which data is to be derived from the signals that are read in via the inputs of the I/O module and transmitted to the head station. A configuration can also be used to specify which signals are to be derived from data received by the head station and to be output at the outputs of the I/O module. In addition, a change or update of the configuration may be necessary after an initial configuration, for example if the assigned tasks and/or the environment of an I/O module changes, or a defective I/O module has to be replaced.

SUMMARY OF THE INVENTION

It is therefore an object of the present invention to carry out a procedure for the configuration/reconfiguration of an I/O module (or generally a fieldbus node/a device) in the background (i.e., in particular during ongoing operation).

A first device according to an exemplary embodiment of the invention comprises a bus interface and a Fountain code decoding unit, set up to reconstruct a configuration data record from a plurality of data packets received via the bus interface, wherein the device is set up to configure or to reconfigure itself using the reconstructed configuration data record, wherein the configuration or the reconfiguration changes how received instructions are processed by the device and/or process images to be sent are generated by the device, the device is set up to perform the configuration or the reconfiguration at a specific point in time which is communicated to the device via the bus interface, the device is designed as a modular fieldbus node and/or comprises an I/O module and the bus interface is set up for connecting a head station of the modular fieldbus node with a higher-level control unit 20 or for connecting the I/O module with a head station of a modular fieldbus node to which the I/O module is attached during operation.

The I/O module can include one or more inputs and/or outputs that are set up to connect field devices.

In this case, the term "I/O module", can be understood particularly as a modular device that can be connected to a head station or connected during operation, said modular device connecting one or more field devices to the head station, and if necessary (via the head station) to a higher-level controller. Furthermore, the term "head station", can be understood as being a component of a modular fieldbus node that is tasked with making the data and/or services of the I/O modules added to the head station available via the fieldbus, to which the head station is connected.

Furthermore, the term "receiving" can be understood to be, in particular, the transmission of data by means of electrical signals from the head station via a wired transmission path (in particular a local bus) to the I/O module (receiver). The term "local bus" can be understood in particular to be a bus via which (only) the I/O modules attached to the head station are (directly) connected to one another or to the head station. In this context, the term "bus interface" can be understood in particular as an interface that is set up for connection to a local bus.

Furthermore, the term "configuration data record" can be understood as, in particular, a data record that specifies how process images are to be generated (for example, how data is to be derived from signals read in at the inputs of the I/O module and how said data is to be transmitted to the head station via the local bus/bus) and/or how signals (which are, e.g., emitted at the outputs of the I/O module) are to be derived from data that is transmitted from the head station to the I/O module via the local bus. For example, field devices can be connected to the inputs and/or outputs, which supply status signals or process control signals. In this context, the term "field device" can be sensors and/or actuators connected (via signal technology) to the I/O module (for example, attached to the I/O module).

Furthermore, the terms "input" or the term "output" can be understood in particular as electrical connections, such as connecting terminals.

In addition, the term "Fountain code decoding unit" can be understood in particular as an electronic circuit which is set up to receive data packets that have been generated on the basis of the configuration data record and to successively reconstruct the configuration data record from the data packets. Here, the Fountain code decoding unit decodes data packets that are continuously generated using a Fountain code encoding unit. The Fountain code encoding unit can, for example, be set up to generate any number (that is, in particular unlimited and not to be configured in advance) of encoded data packets with $I' \ll I$ ($I$ being equal to the size of the configuration data record to be reconstructed) and to send these to the I/O module. On the receiver side, it is sufficient if the I/O module receives any number m of these packets, as this is sufficient to reconstruct the original configuration data record (which leads to a transmission volume of the size $m \times I' = I + \varepsilon$).

The I/O module is preferably set up to receive messages cyclically from the head station, wherein the messages have payload data portions in each of which a sub-area of a constant size is reserved for the transmission of the data packets.

The Fountain code decoding unit can be set up to persistently store a decoding progress.

The Fountain code decoding unit can be set up to delete the persistently stored decoding progress in response to an indication that the configuration or reconfiguration is aborted.

The device preferably comprises a processor on which a decoding routine is cyclically executed during the reconstruction, wherein if the processor utilization exceeds an upper threshold, the cyclical execution of the decoding routine is temporarily suspended or restricted and one or more of the data packets received at this time are ignored during reconstruction.

For example, the Fountain code decoding unit may have a (limited) input buffer which overflows when the cyclical execution of the decoding routine is temporarily suspended or restricted.

The device can be included in a system that includes a head station and a computer, wherein the computer is set up to transmit the data packets derived from the configuration data record to the head station or the head station is set up to derive the data packets from the configuration data record.

A second device according to the invention comprises a communication interface and a Fountain code decoding unit, set up to reconstruct a configuration data record from a plurality of data packets received via the communication interface, wherein the device is set up to configure or reconfigure itself using the reconstructed configuration data record to carry out the configuration or the reconfiguration at a specific point in time, which is communicated to the device via the communication interface.

The configuration or the reconfiguration can change how received instructions are processed by the device and/or process images to be sent are generated by the device.

A method according to the invention for configuring a device comprises receiving data packets by the device, reconstructing a configuration data record based on the data packets using a Fountain code decoding unit and, if the configuration data record has been successfully reconstructed, configuring or reconfiguring the device on the basis of the configuration data record.

The configuration or the reconfiguration can change how instructions received by the device are processed by the device and/or process images provided by the device are generated by the device.

The configuration or the reconfiguration can be carried out at a point in time which is communicated to the device via the communication interface.

The device can be designed as a modular fieldbus node and the method can also include attaching an I/O module to a head station of the modular fieldbus node, determining the configuration data record for the configuration of one or more inputs and/or outputs of the I/O module, deriving data packets from the configuration data record and transmitting the data packets to the I/O module via a bus that connects the head station to the I/O module.

The method preferably further comprises writing the data packets to payload portions of messages which, in addition to a data packet, also include an area reserved for a control data record, wherein the control data record is provided for controlling field devices connected to the I/O module.

The reconstruction preferably comprises a cyclical execution of a decoding routine on a processor of the device, wherein the cyclical execution of the decoding routine is temporarily suspended and one or more data packets received at that time are ignored during reconstruction if the processor utilization exceeds an upper threshold.

Preferably, the method further comprises persistent storage of a decoding progress and a continuation of the reconstruction after a restart of the device on the basis of the decoding progress.

Deriving the data packets from the configuration data record preferably includes dividing the configuration data record into parts of equal length and deriving data packets from one or more of the parts.

It is understood that the steps carried out by a device can be understood to be steps of a corresponding method that is implemented using the device, and vice versa.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
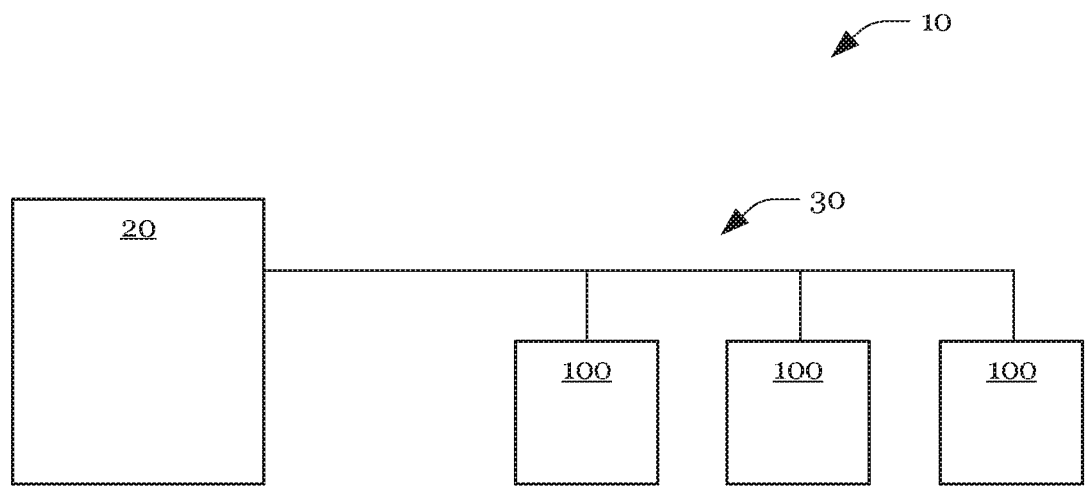
FIG. 1 illustrates a fieldbus system.

FIG. 1 shows a block diagram of a fieldbus system 10. The fieldbus system 10 comprises a higher-level control unit 20, to which a plurality of devices 100 (fieldbus nodes) are connected via a fieldbus 30. The higher-level control unit 20 can serve both for monitoring and for regulating a system that is controlled by the fieldbus system 10. If the higher-level control unit 20 monitors a system, the higher-level control unit 20 can cyclically or acyclically receive status data from the fieldbus nodes 100 that describe the state of the system and generate an error signal or an alarm signal if the state of the system (substantially) deviates from a desired/permitted state or state range. If the higher-level control unit 20 (not only monitors, but also) regulates the system, the higher-level control unit 20 can receive status data cyclically or acyclically from the fieldbus nodes 100 and, taking into account the status data, calculate control data that is transmitted to the fieldbus nodes 100.

Figure 2:
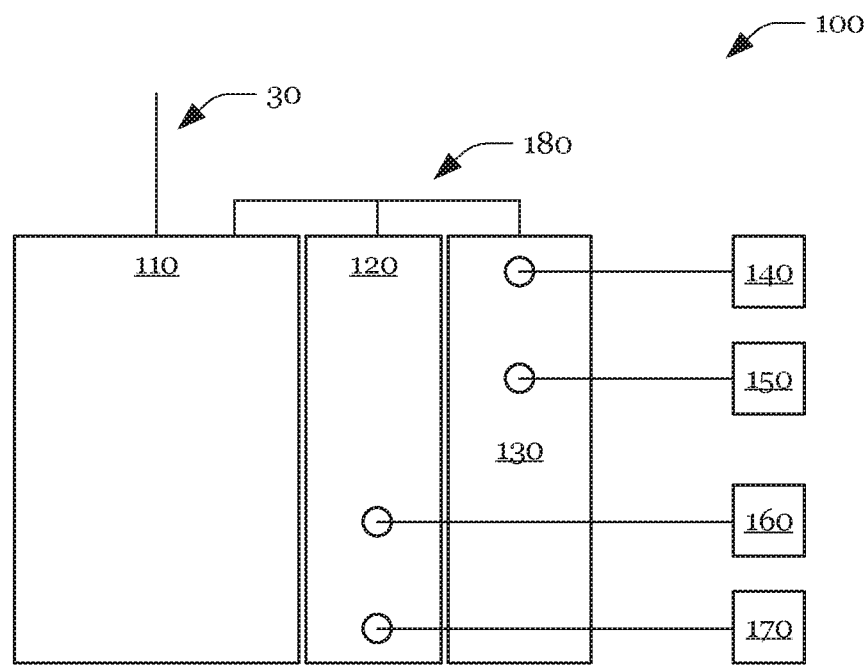
FIG. 2 illustrates a fieldbus node and fieldbus devices connected to the fieldbus node.

FIG. 2 shows an exemplary modular fieldbus node 100, formed of a head station 110 and two I/O modules 120, 130 attached to the head station 110, to which field devices 140, 150, 160, 170, such as sensors and actuators, are connected. During operation, the I/O modules 120, 130 read in sensor signals via the inputs and use the sensor signals to generate status data which is transmitted to the head station 110 via the local bus 180. The head station 110 can locally process the status data and/or (possibly in a modified form) forward them to the higher-level control unit 20. The higher-level control unit 20 (or, in the case of local processing, the head station 110) can then generate control data, taking into account the status data.

The control data generated by the higher-level control unit 20 can then be transmitted via the fieldbus 30 to (the same or) a (different) head station 110. The control data transmitted to the head station 110 (or the control data generated by the head station 110) is then forwarded/transmitted (possibly in modified form) to the I/O modules 120, 130. The I/O modules 120, 130 receive the control data and output control signals corresponding to the control data at the outputs to which the actuators are connected. The communication of data between the components of the fieldbus system 10 and the mapping of the sensor signals to status data and the mapping of the control data to control signals can be adapted to different application scenarios by configuring the fieldbus nodes 100.

Figures 3, 4:
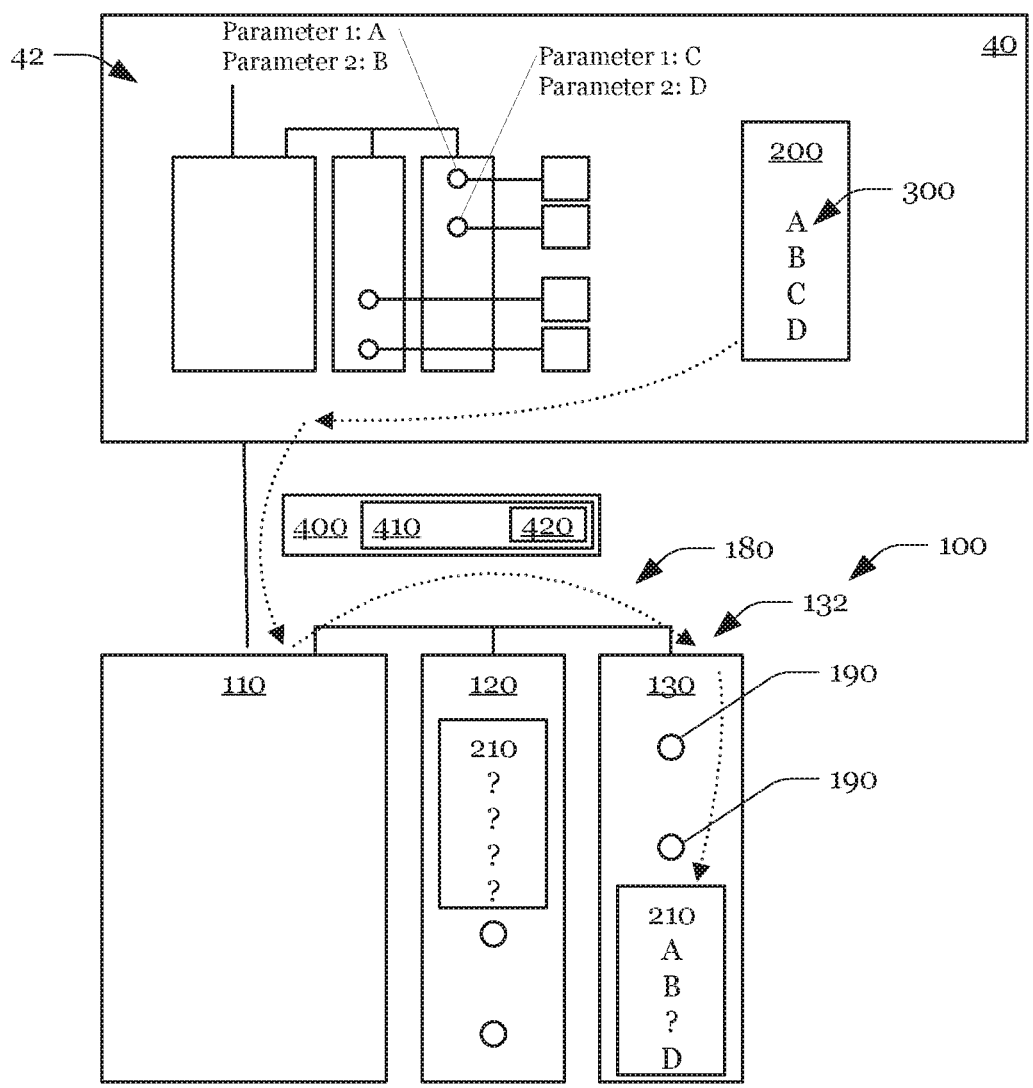
FIG. 3 illustrates a fieldbus node and a computer connected to the fieldbus node.
FIGS. 4-6 illustrate a process for configuring a device and, in particular, an I/O module.

FIG. 3 shows a fieldbus node and a computer 40 which is connected to the fieldbus node and is set up to configure the I/O modules 120, 130 of the fieldbus node 100. The computer 40 shown in FIG. 3 can serve solely or predominantly for the configuration and can also (in addition to the configuration) perform other tasks. In particular, the computer 40 can be part of the higher-level controller 20 and, in addition to the configuration, also perform monitoring and/or control tasks. For example, the computer 40 can monitor the system and be set up to switch from one operating mode to another operating mode when certain conditions are present (and if necessary to change or update the configuration in the course of the switchover).

As illustrated in FIG. 4, the computer 40 can have a display device 42 on which a graphical user interface of a configuration program can be displayed. The graphical user interface can make it possible to graphically display the desired topology of the fieldbus node 100 and to assign the parameters required for configuration to the I/O modules 120, 130 and in particular to the inputs and/or outputs 190. A configuration data record 300 can be formed from the totality of all parameters for each of the I/O modules 120, 130 (or for all of them together). The Fountain code encoding unit 200 derives data packets from a configuration data record 300, which data packets are transmitted to the respective I/O module 120, 130 via the head station 110 and the local bus 180.

For example, in the example shown in FIG. 4, the Fountain code encoding unit 200 derives data packets from the configuration data record 300, which includes the parameters A, B, C and D, which are assigned to the inputs and/or outputs 190, which data packets are transmitted to the corresponding I/O module 130 via the head station 110 and the local bus 180. The I/O modules 120, 130 include Fountain code decoding units 210 which are set up to reconstruct the configuration data record 300 from the data packets received by the respective I/O module 120, 130 via the bus interface 132 from the head station 110. Alternatively, the head station 110 can be provided with a Fountain code decoding unit 210 which forwards the decoded configuration data record 300 to the respective I/O module 120, 130. Because of the Fountain code encoding, it does not matter whether individual data packets are lost or incorrectly transmitted (as long as the incorrect data packets are recognized as incorrect or the errors can be corrected).

In order to be able to carry out a configuration of the I/O module 130 during operation, the data packets can be transmitted in messages 400 containing payload portions 410 in each of which (only) a sub-area 420 of a constant size (i.e. a constant length or a constant number of bits) is reserved for the transmission of the data packets. Control data or other useful data, for example, can then be transmitted in the respectively remaining payload portion. In this case, it is understood that not all messages 400 need to have a sub-area 420 reserved for the transmission of the data packets, or that the reserved sub-area 420 can be used for other purposes if no configuration is performed. On the other hand, the Fountain code encoding unit 200 can also be set up to continuously derive data packets and to transmit these to the respective devices.

The Fountain code decoding unit 210 can also be set up to persistently store the decoding progress. This can be particularly advantageous when the I/O module 130 has to be restarted (intentionally or unintentionally) or is briefly disconnected from the power supply. Because of the persistent storage, the Fountain code decoding unit 210 can continue reconstructing the configuration data record 300 at the point at which the decoding progress was last stored persistently. The configuration data record 300 can thus be reconstructed even in the event of frequent restarts and/or power supply gaps. Furthermore, it can be provided that the Fountain code decoding unit 210 is set up to delete the persistently stored decoding progress in response to an indication that the configuration or reconfiguration is aborted. For example, messages 400 may indicate that the configuration or reconfiguration is aborted, e.g. by a flag being set in one or more messages (the receipt of which may have to be confirmed by the I/O module 130).

The Fountain code decoding unit 210 can furthermore comprise a processor on which a decoding routine is cyclically executed during the reconstruction, wherein the I/O module 130 is set up to temporarily suspend or restrict the cyclic execution of the decoding routine if the processor utilization exceeds an upper threshold, and to ignore one or more data packets received during the reconstruction. In this case, the processor can be provided either only for the decoding routine or for other tasks. For example, the processor used in the context of decoding can also be provided to derive status data from the sensor signals and/or control signals from the control data. Thus, the processor utilization exceeding an upper threshold, for example, can also result from the fact that a frequency with which the sensor signals and/or control data are processed increases, or the processor (cyclically or acyclically) executes instructions which would task the processor over a short period of time in such a way that the processing of the sensor signals and/or the control data would be impaired if the reconstruction of the configuration data record 300 were not reduced or restricted and at least partially suspended.

Figure 5:
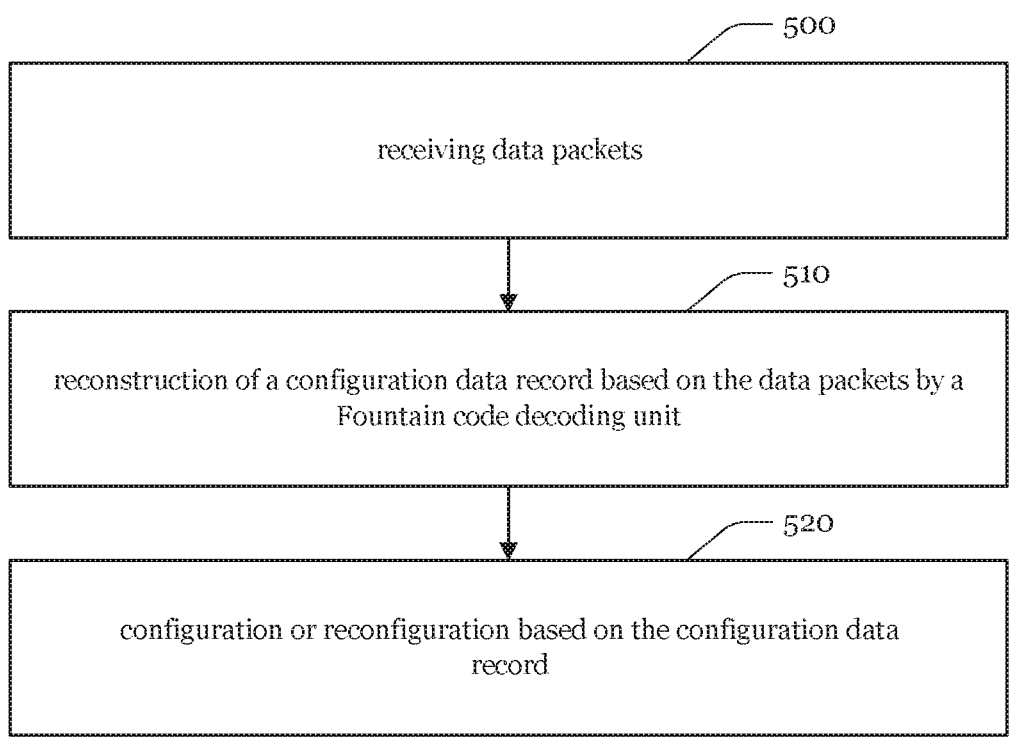

FIG. 5 shows steps of a process for configuring the modular fieldbus node 100. The process begins with a step 500 of the fieldbus node 100 receiving data packets. In step 510, the configuration data record 300 is then reconstructed using a Fountain code decoding unit 210 based on the data packets. If the configuration data record 300 has been successfully reconstructed, the fieldbus node 100 can be configured or reconfigured on the basis of the configuration data record 300 in step 520. As stated above, the Fountain code decoding unit 210 can be arranged both in the head station 110 and in one of the I/O modules 120, 130.

Figure 6:
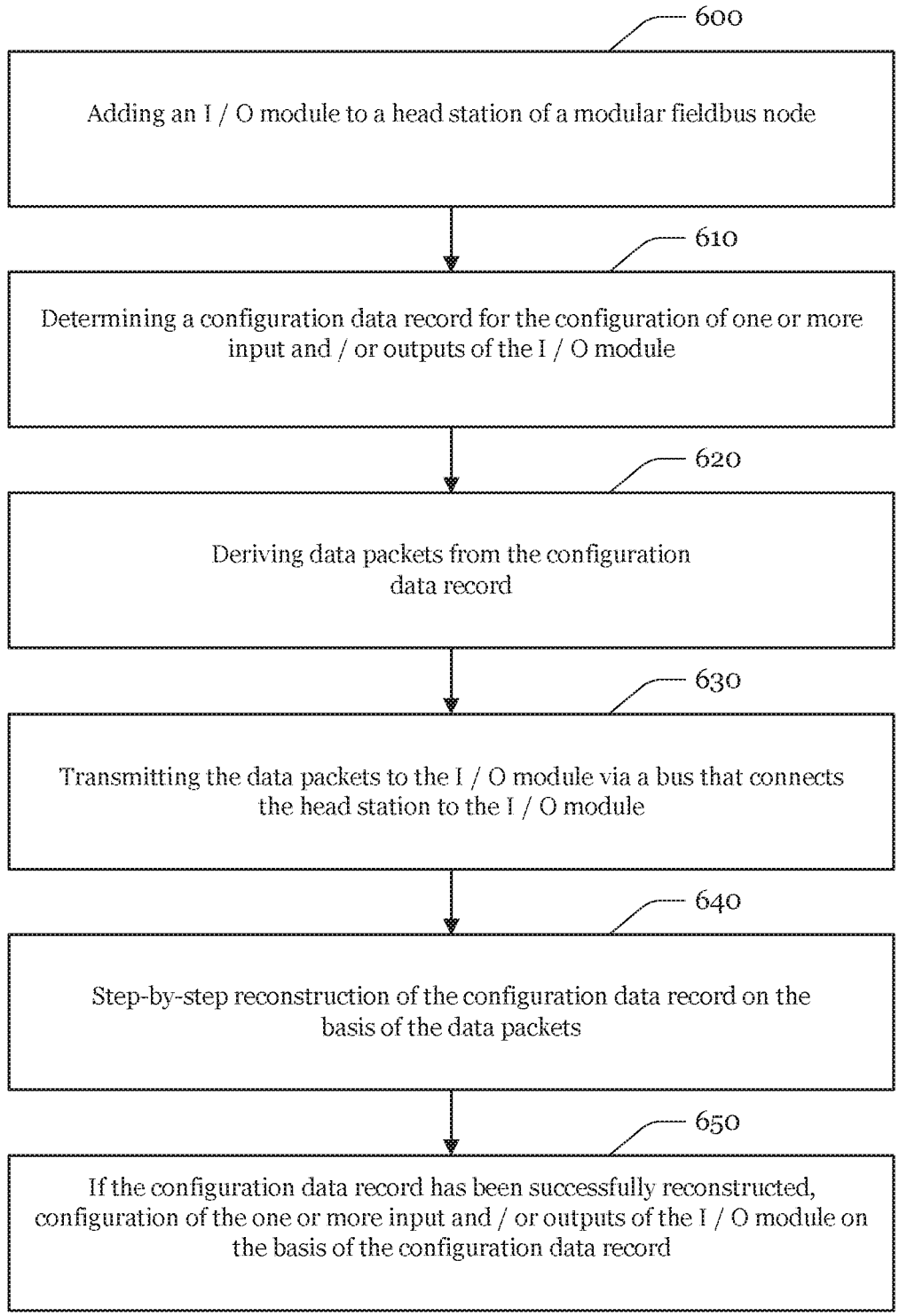

FIG. 6 shows steps of a process for configuring the I/O module 130 of the modular fieldbus node 100. The process begins with a step 600 of adding the I/O module 130 to the head station 110 of the modular fieldbus node 100. In step 610, the configuration data record 300 for the configuration of one or more of the inputs and/or outputs 190 of the I/O module 130 is specified. The configuration data record 300 can be specified by a user entering it into a computer 40 (e.g. by mapping the topology in a graphical user interface) or automatically by automatically recognizing the elements of the modular fieldbus node 100 and by assigning the specified (for the respective element) parameters.

In step 620, data packets can be derived from the configuration data record 300. Deriving the data packets from the configuration data record 300 can include dividing the configuration data record 300 into parts of equal length and deriving data packets from one or more of the parts. The deriving of data packets can also take place continuously, so that a data packet can be assigned to each message 400. In step 630, the data packets are transmitted to the I/O module 130 via the bus 180. On the basis of the data packets, the configuration data record 300 is reconstructed step by step in step 640. In this case, the start of the reconstruction can be delayed until a certain amount of information about the configuration data record 300 can be taken from the entirety of all received data packets. If the configuration data record 300 has been successfully reconstructed, the inputs and/or outputs 190 of the I/O module 130 are configured on the basis of the configuration data record 300 in step 650.

It is understood that in this way not only the I/O module 130 but all the elements of a modular fieldbus node 100 to be configured can be configured (or parameterized).

If the computer 40 (parameterizer) permanently sends Fountain code-encoded data packets to the devices to be parameterized, the devices are hot-pluggable:

If the device is not yet in operation or is no longer in operation, it does not receive the encoded data packets. This does not do any harm, since any later encoded data packets enable the successful decoding of the original configuration data record 300 after operation is resumed.

If the device has already received a few, but not enough, encoded packets, but has to stop (e.g. due to a restart, an acute need for computing power elsewhere or an overflow of the receive buffer with the discarding of newly arriving data packets), this does not matter either. The device can later resume reception and continue to use the previously received encoded packets. It is therefore not necessary to restart the reception "at zero", but rather resumption is possible.

If the device is in operation (but not yet configured) and receives an encoded packet, it can buffer this in its own memory and, after each or every k-th received encoded packet, periodically attempt to decode the original data from these stored encoded packets (wherein the decoding algorithm determines whether the decoding was successful or whether encoded packets are still missing) or estimate in advance from the parameterization of the Fountain code how many encoded packets are required.

This means that devices can be exchanged without having to manually initiate a configuration process, saving resources (laptop with engineering software, access rights, etc.). Devices can also discard incoming packets when no resources (computing time, memory, etc.) are available at that time. Furthermore, devices can restart without changing the parameterization process from the perspective of the parameterizer. In addition, the start-up of the modular fieldbus node 100 is equalized since there are fewer dependencies, or the mechanisms required to be able to react specifically in the event of non-availability are superfluous.

In addition, the procedure can also be used to enable reconfiguration during operation. A device can, for example, be set up to compare the parameters with the currently used parameters after decoding the configuration data record. In the event that the parameters are identical, the configuration data record can be discarded and decoding can be started again. If there is a variance, the device can reconfigure itself.

It can be provided that the reconfiguration is carried out immediately, or that a central control signal is waited for, which causes the entire system to change to a new operating mode at a certain point in time, which requires the reconfiguration of the devices. To increase security, it can also be provided that the reconstruction of the configuration data record and/or the successful (re) configuration is signaled or displayed by the device.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device comprising:
   a bus interface; and
   a fountain code decoding unit configured to reconstruct a configuration data record from a plurality of data packets comprising the configuration data record encoded as fountain coded data, the data packets being received via the bus interface,
   wherein the device is set up to configure or to reconfigure itself using the reconstructed configuration data record,
   wherein the configuration or the reconfiguration changes how received instructions are processed by the device and/or process images to be sent are generated by the device,
   wherein the device is set up to carry out the configuration or the reconfiguration at a specific point in time which is communicated to the device via the bus interface,
   wherein the device is designed as a modular fieldbus node and/or comprises an input/output module (I/O module), and
   wherein the bus interface is set up for connecting a head station of the modular fieldbus node to a higher-level control unit or for connecting the I/O module to a head station of a modular fieldbus node to which the I/O module is connected during operation.

2. The device according to claim 1, wherein the input-output module comprises one or more inputs and/or outputs which are configured to connect field devices.

3. The device according to claim 2, wherein the I/O module is set up to cyclically receive messages from the head station, wherein the messages contain payload portions, in each of which a sub-area of a constant size is reserved for the transmission of the data packets.

4. The device according to claim 1, wherein the fountain code decoding unit is set up to persistently store a decoding progress to decode the fountain code.

5. The device according to claim 4, wherein the fountain code decoding unit is configured to delete the persistently stored decoding progress in response to an indication that the configuration or reconfiguration is aborted.

6. The device according to claim 1, wherein the device comprises a processor on which a decoding routine to decode the fountain coded data is cyclically executed during the reconstruction, wherein the device is set up to temporarily suspend or restrict the cyclical execution of the decoding routine if the processor utilization exceeds an upper threshold and to ignore one or more of the data packets received at that time when reconstructing.

7. The device according to claim 1,
   wherein the device is adapted to connect to the head station and a computer,
   wherein the computer is set up to transmit the data packets derived from the configuration data record to the head station or the head station is set up to derive the data packets from the configuration data record.

8. A device comprising:
   a communication interface; and
   a fountain code decoding unit configured to reconstruct a configuration data record from a plurality of data packets received via the communication interface, the data packets comprising the configuration data record encoded as fountain coded data;
   wherein the device is set up to configure or reconfigure itself using the reconstructed configuration data record, wherein the fountain code decoding unit is set up to persistently store a decoding progress to decode the fountain coded data.

9. The device according to claim 8, wherein the device is set up to perform the configuration or the reconfiguration at a specific point in time, which is communicated to the device via the communication interface.

10. The device according to claim 8, wherein the configuration or the reconfiguration changes how received instructions are processed by the device and/or process images to be sent are generated by the device.

11. A method of configuring a device, the method comprising:
receiving, at the device, data packets comprising a configuration data record encoded as fountain coded data;
reconstructing the configuration data record on the basis of the data packets using a fountain code decoding unit;
configuring or reconfiguring the device on the basis of the configuration data record if the configuration data record has been successfully reconstructed,
continuously storing a decoding progress to decode the fountain coded data; and
continuing with the reconstruction on the basis of the decoding progress.

12. The method according to claim 11, wherein the configuration or the reconfiguration changes how instructions received by the device are processed by the device and/or process images provided by the device are generated by the device and the configuration or the reconfiguration is carried out at a specific point in time, which is communicated to the device via the communication interface.

13. The method according to claim 11, wherein the device is designed as a modular fieldbus node, and wherein the method further comprises:
connecting an I/O module to a head station of the modular fieldbus node;
identifying the configuration data record for the configuration of one or more inputs and/or outputs of the I/O module;
deriving the data packets from the configuration data record; and
transmitting the data packets to the I/O module via a bus which connects the head station with the I/O module.

14. The method according to claim 13, further comprising:
writing the data packets to payload portions of messages which, in addition to a data packet, also include an area reserved for a control data record, wherein the control data record is provided to control field devices that are connected to the I/O module.

15. The method according to claim 13, wherein the reconstructing comprises cyclically executing a decoding routine to decode the fountain coded data on a processor of the I/O module, wherein the cyclic execution of the decoding routine is temporarily suspended and one or more during data packets received at this time are ignored during reconstruction if the processor utilization exceeds an upper threshold.

16. The method according to claim 13, further comprising:
continuing with the reconstruction after a restart of the I/O module on the basis of the decoding progress.

17. The method according to claim 13, wherein deriving the data packets from the configuration data record comprises dividing the configuration data record into parts of equal length and deriving data packets from one or more of the parts.

18. The device according to claim 1, wherein the data packets are received in messages containing payload portions that contain the fountain coded data, at least one of the payload portions having a sub-area of a constant size for storing the fountain coded data.

19. The device according to claim 1, wherein the device is set up to carry out the configuration or the reconfiguration during operation.

20. The device according to claim 8, wherein the device is set up to carry out the configuration or the reconfiguration during operation.

* * * * *